United States Patent
Tantot et al.

(10) Patent No.: US 11,913,378 B2
(45) Date of Patent: Feb. 27, 2024

(54) ASSEMBLY FOR A TURBOMACHINE

(71) Applicants: INSTITUT SUPERIEUR DE L AERONAUTIQUE ET DE L ESPACE, Toulouse (FR); SAFRAN AIRCRAFT ENGINES, Paris (FR)

(72) Inventors: Nicolas Jérôme Jean Tantot, Moissy-Cramayel (FR); Xavier Carbonneau, Toulouse (FR); Philippe Gérard Chanez, Moissy-Cramayel (FR); Nicolas Garcia Rosa, Toulouse (FR); Alejandro Martin Pleguezuelo, Toledo (ES); Nicolas Joseph Sirvin, Moissy-Cramayel (FR)

(73) Assignees: INSTITUT SUPERIEUR DE L AERONAUTIQUE ET DE L ESPACE, Toulouse (FR); SAFRAN AIRCRAFT ENGINES, Paris (FR)

( * ) Notice: Subject to any disclaimer, the term of this patent is extended or adjusted under 35 U.S.C. 154(b) by 126 days.

(21) Appl. No.: 17/768,933

(22) PCT Filed: Oct. 15, 2020

(86) PCT No.: PCT/FR2020/051841
§ 371 (c)(1),
(2) Date: Apr. 14, 2022

(87) PCT Pub. No.: WO2021/074535
PCT Pub. Date: Apr. 22, 2021

(65) Prior Publication Data
US 2023/0349323 A1 Nov. 2, 2023

(30) Foreign Application Priority Data
Oct. 15, 2019 (FR) ...................... 1911490

(51) Int. Cl.
*F02C 7/04* (2006.01)
*B64D 29/00* (2006.01)
(Continued)

(52) U.S. Cl.
CPC .............. *F02C 7/042* (2013.01); *B64D 29/00* (2013.01); *B64D 33/02* (2013.01); *B64D 2033/0233* (2013.01); *B64D 2033/0286* (2013.01)

(58) Field of Classification Search
CPC . F02C 7/05; F02C 7/042; B64D 29/00; B64D 33/02; B64D 2033/0233; B64D 2033/0286
See application file for complete search history.

(56) References Cited

U.S. PATENT DOCUMENTS 5,000,399 A * 3/1991 Readnour .............. B64D 33/02
244/130
5,014,933 A * 5/1991 Harm .................... B64D 33/02
181/220
(Continued)

FOREIGN PATENT DOCUMENTS

GB 1 410 160 A 10/1975

OTHER PUBLICATIONS

French Search Report for French Application No. 1911490, dated Jun. 25, 2020.
(Continued)

*Primary Examiner* — Igor Kershteyn
(74) *Attorney, Agent, or Firm* — BIRCH, STEWART, KOLASCH & BIRCH, LLP

(57) ABSTRACT

The invention relates to an assembly for a turbomachine, comprising: —a nacelle comprising an inlet lip which defines an air inlet, and—a device for modifying the geometry of the air inlet, comprising: —a first spout, and—a
(Continued)

second spout, the first spout and the second spout being translatably movable in relation the nacelle between: —a first configuration, in which the first spout forms the inlet lip and the second spout extends inside the nacelle, and—a second configuration, in which the first spout extends away from the inlet lip, and the second spout forms the inlet lip so as to define an air flow channel between a downstream surface of the first spout and an upstream surface of the second spout.

13 Claims, 13 Drawing Sheets

(51) Int. Cl.
*B64D 33/02* (2006.01)
*F02C 7/042* (2006.01)

(56) References Cited

U.S. PATENT DOCUMENTS

| | | | | |
|---|---|---|---|---|
| 5,177,957 | A * | 1/1993 | Grieb | F02C 7/042 |
| | | | | 244/53 B |
| 7,871,455 | B1 * | 1/2011 | Sands | B64D 33/02 |
| | | | | 96/417 |
| 9,719,421 | B2 * | 8/2017 | Todorovic | B64D 29/00 |
| 2010/0084507 | A1 * | 4/2010 | Vauchel | F02C 7/04 |
| | | | | 244/1 N |
| 2010/0148012 | A1 * | 6/2010 | McDonough | B64D 29/00 |
| | | | | 244/53 B |
| 2011/0014044 | A1 * | 1/2011 | Vauchel | B64D 29/06 |
| | | | | 415/214.1 |
| 2011/0038727 | A1 * | 2/2011 | Vos | B64C 11/20 |
| | | | | 416/1 |
| 2011/0308634 | A1 * | 12/2011 | Mouton | B64D 29/06 |
| | | | | 137/15.1 |
| 2014/0127001 | A1 | 5/2014 | Todorovic | |

OTHER PUBLICATIONS

International Search Report for International Application No. PCT/FR2020/051841, dated Jan. 21, 2021.

* cited by examiner

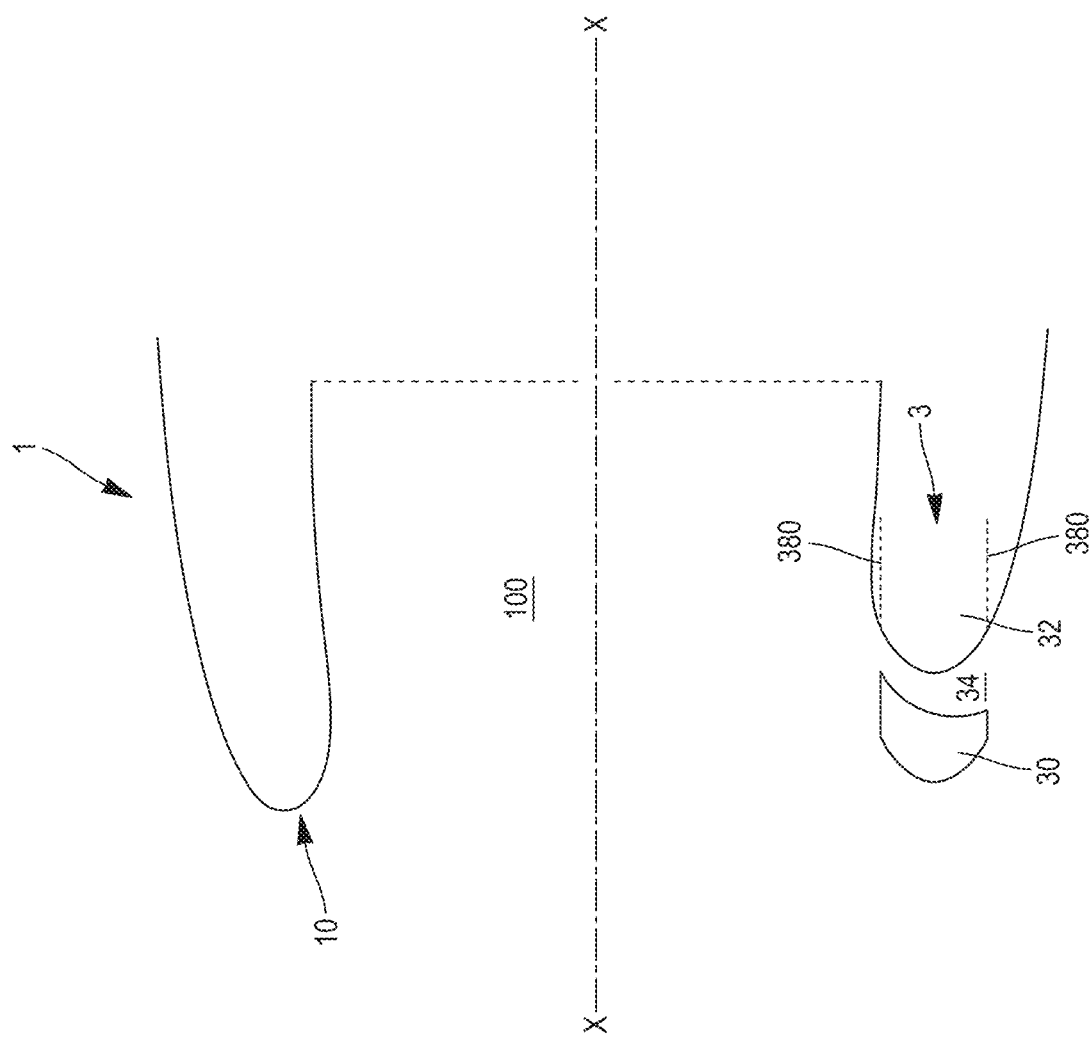

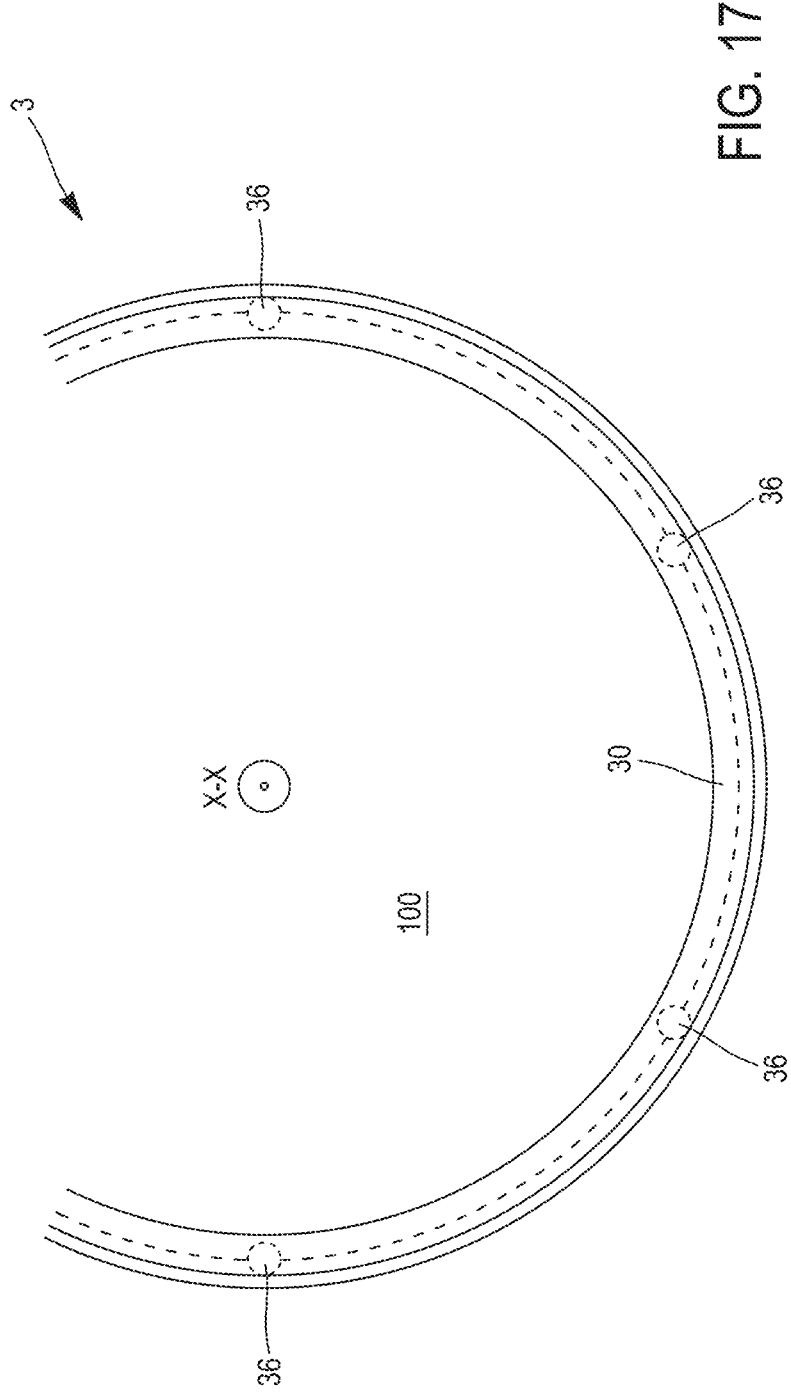

ASSEMBLY FOR A TURBOMACHINE

FIELD OF THE INVENTION

The invention relates to a gas turbine engine nacelle.

The aim of the invention more specifically is a gas turbine engine nacelle comprising a device for modifying air intake geometry.

PRIOR ART

Gas turbine engines are known which have a high bypass ratio in light of improving their propulsive efficiency. These gas turbine engines however have substantial volume and mass, which penalises the efficiency of the aircraft they propel, and causes increased geometric installation restrictions.

To eliminate this disadvantage, it is known to shorten the nacelle of the gas turbine engine. All the same, the air intake is deprived of its capacity to limit the generation and/or transmission of distortions in the airflow admitted by the gas turbine engine. Such distortions are harmful to the stability and the performance of the gas turbine engine, especially its fan.

A known way of resolving this problem consists of fitting the nacelle with a device for modifying the air intake geometry. Such a device generally comprises a part which is mobile between a retracted position, where the air intake has a nominal geometry, and a deployed position, where the geometry of the air intake is modified. In this way, during low forward speeds of the aircraft, the travel of the stopping point within the airflow can be reduced owing to opening of an additional supply section of admitted airflow. Also, the usual phenomenon of bypassing of the air intake lip by the flow is minimised. This phenomenon in fact typically occurs at low forward speeds when the radially external part of the flow is deflected towards the exterior of the nacelle by the bulging shape of the air intake lip. This causes a loss in admitted airflow which can be harmful to performance of the gas turbine engine.

All the same, devices for modifying the air intake geometry known from the prior art have many disadvantages. For example, deployment causes unwanted aerodynamic phenomena, that is, perturbations of flow such as delaminations of boundary layer within the flow, causing major charge losses within the admitted airflow. Also, in retracted position, the mobile part has many discontinuities which boost drag within the flow. In addition, the mechanisms needed for shifting from the retracted position to the deployed position are generally complex and bulky, and this limits their integration within a gas turbine engine nacelle. Finally, such devices have no redundant systems in the event of malfunction of deployment mechanisms.

There is therefore a need to eliminate at least one of the disadvantages of the prior art described earlier.

DESCRIPTION OF THE INVENTION

One of the aims of the invention is to reduce the transmission and/or generation of distortions within the intake of a gas turbine engine, especially a gas turbine engine comprising a nacelle of reduced axial dimension and thickness.

Another aim of the invention is to improve the aerodynamic properties of a gas turbine engine nacelle, irrespective of the conditions of airflow.

Another aim of the invention is to propose a nacelle the air intake of which has variable geometry.

Another aim of the invention is to reinforce the robustness of the aerodynamic behaviour of a nacelle in its entire field of operation.

Another aim of the invention is to limit unwanted aerodynamic phenomena during deployment of a device for modifying air intake geometry, both inside and outside the nacelle.

In this respect, the aim of the invention is an assembly for a gas turbine engine comprising:
  a gas turbine engine nacelle having a longitudinal axis and comprising an intake lip defining an air intake, and
  a device for modifying the geometry of the air intake, said device comprising:
    a first slat, and
    a second slat,
  the first slat and the second slat being mobile in translation according to the longitudinal axis relative to the nacelle between:
    a first configuration where the first slat forms the intake lip and the second slat extends inside the nacelle, without interaction with the external airflow, and
    a second configuration where the first slat extends at a distance from the intake lip, and the second slat forms the intake lip so as to define an airflow channel between a downstream surface of the first slat and an upstream surface of the second slat.

In such an assembly, the air capture surface can be increased at low forward speed of the aircraft on which the nacelle is mounted (that is, absolute speed of the aircraft relative to the ground), due to the airflow channel of the second configuration. Also, the length of the air intake can be lengthened at low forward speed, still due to the second configuration, which limits transmission and/or generation of distortions within the intake. Also, the length of the air intake remains short at high forward speed, due to the first configuration, which limits the aerodynamic losses of the gas turbine engine. Also, shifting from the first configuration to the second configuration ensures stable aerodynamic behaviour of the flow. Finally, it is possible to design a geometry of the airflow channel by locally modifying (that is, according to a circumferential direction about the longitudinal axis) the downstream surface of the first slat, and/or the upstream surface of the second slat so as to optimise performance of the inlet flow, irrespective of the operating conditions of the gas turbine engine.

Advantageously, though optionally, the assembly according to the invention can also comprise at least one of the following characteristics, taken singly or in combination:
  the second slat has, in a radial plane relative to the longitudinal axis, an upstream profile of the second slat, the upstream profile of the second slat having, in the second configuration, a tangential continuity with a profile of the nacelle defined in the radial plane,
  the first slat has, in a radial plane relative to the longitudinal axis, an upstream profile of the first slat, and the second slat has, in the radial plane, an upstream profile of the second slat, the upstream profile of the second slat being identical to the upstream profile of the first slat,
  the second slat has:
    in a first radial plane relative to the longitudinal axis a first upstream profile of the second slat, and
    in a second radial plane relative to the longitudinal axis, a second upstream profile of the second slat,
  the second upstream profile of the second slat being different to the first upstream profile of the second slat, such that the airflow channel has, in the first radial plane, a first longitudinal section, and in the second radial plane, a second longitudinal section, the second longitudinal section being different to the first longitudinal section, the first slat has:
  in a first radial plane relative to the longitudinal axis, a first downstream profile of the first slat, and
  in a second radial plane relative to the longitudinal axis, a second downstream profile of the first slat,
the second downstream profile of the first slat being different to the first downstream profile of the first slat, such that the airflow channel has, in the first radial plane, a first longitudinal section, and in the second radial plane, a second longitudinal section, the second longitudinal section being different to the first longitudinal section,
over at least one angular portion of the device for modifying the geometry of the air intake, the first slat and the second slat are connected so as to form a single slat, also mobile in translation according to the longitudinal axis relative to the nacelle,
the first slat and the second slat extend over a first angular portion of the nacelle, a second angular portion of the nacelle being bordered by a fixed part of the air intake lip,
the device for modifying the geometry of the air intake comprises a guide rod extending parallel to the longitudinal axis, and connecting the first slat to the second slat such that, over at least one angular portion of the device for modifying the geometry of the air intake, the first slat is mounted fixed relative to the second slat,
the device for modifying the geometry of the air intake comprises a guide rod extending parallel to the longitudinal axis, the guide rod being telescopic so that over at least one angular portion of the device for modifying the geometry of the air intake, the movement of the first slat is independent of the movement of the second slat,
it comprises an anti-icing system of the first slat and/or of the second slat, comprising an anti-icing fluid circulation channel extending at least in part inside the guide rod,
the device for modifying the geometry of the air intake also comprises an actuator lodged in the nacelle and configured to set in motion the first slat and the second slat between the first configuration and the second configuration,
the nacelle has a non-axisymmetric form.

Another aim of the invention is a gas turbine engine comprising a nacelle such as that described previously.

DESCRIPTION OF THE FIGURES

Other characteristics, aims and advantages of the invention will emerge from the following description which is purely illustrative and non-limiting and which must be considered with respect to the appended drawings, in which:

FIG. 16 is a sectional view of a tenth embodiment of an assembly for a gas turbine engine according to the invention, and FIG. 17 is a frontal view of the tenth embodiment of an assembly for a gas turbine engine according to the invention illustrated in FIG. 14.

DETAILED DESCRIPTION OF THE INVENTION

Gas Turbine Engine Nacelle

Figure 1:
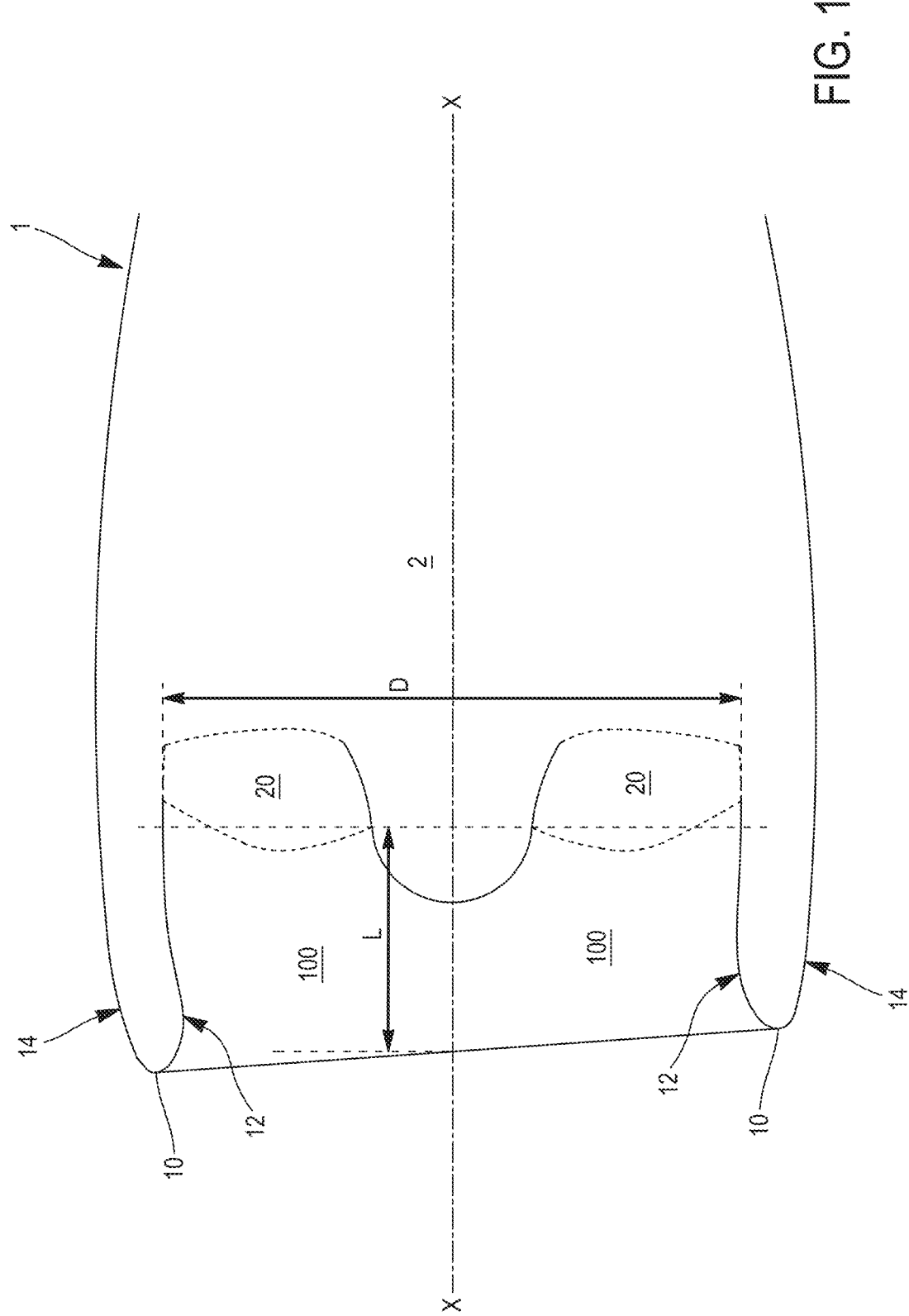
FIG. 1 is a sectional view of a gas turbine engine nacelle.
Figure 2:
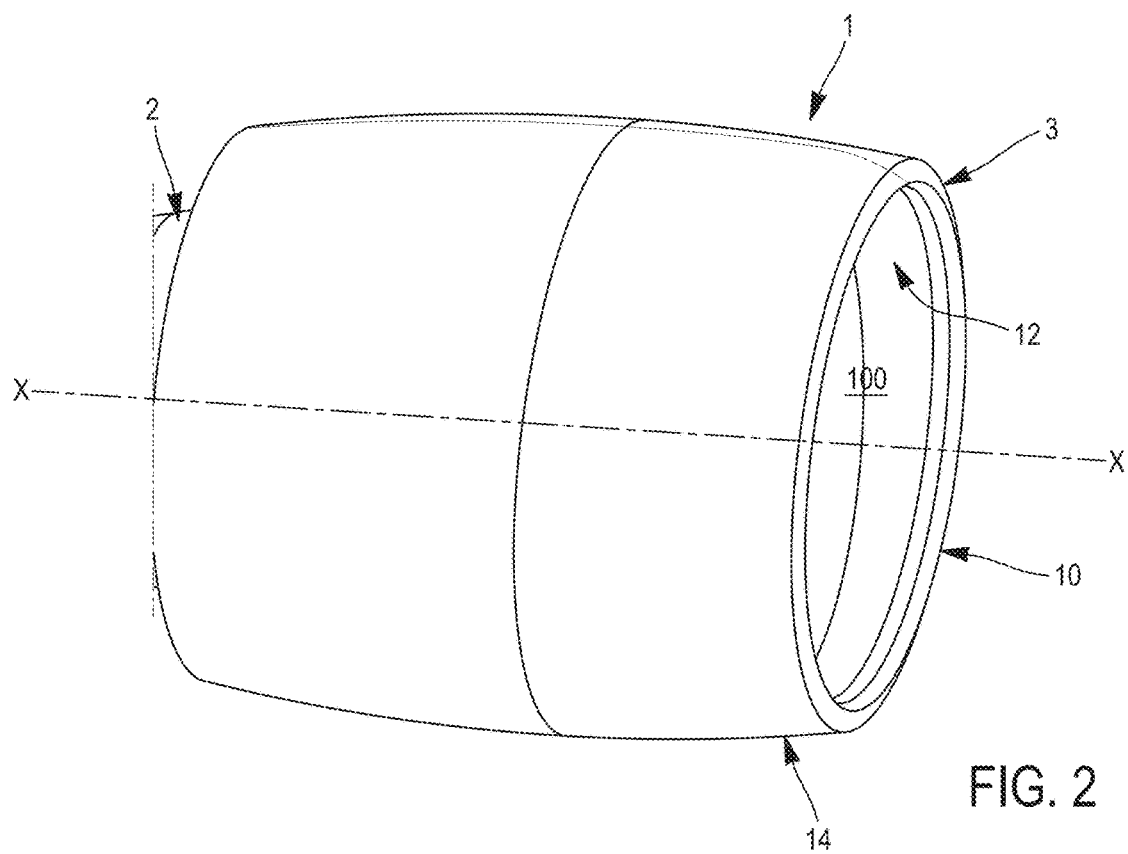
FIG. 2 is a perspective view of a first embodiment of an assembly for a gas turbine engine according to the invention in a first configuration.
Figure 3:
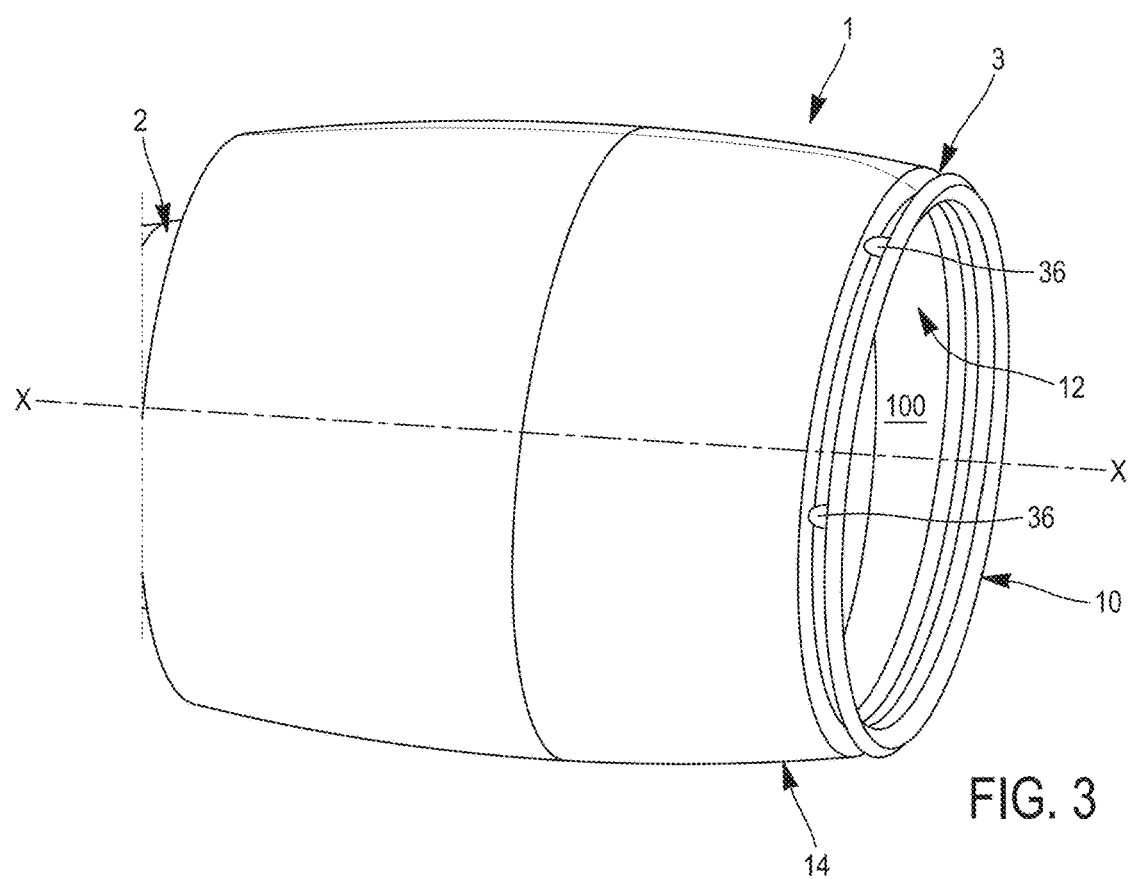
FIG. 3 is a perspective view of the first embodiment of an assembly for a gas turbine engine illustrated in FIG. 1 in a second configuration.

In reference to FIGS. 1 to 3, a gas turbine engine nacelle 1 has a longitudinal axis X-X around which it extends, for example with a revolutionary form, about the longitudinal axis X-X, typically a form substantially cylindrical in revolution. This is not however limiting, since the nacelle 1 can also extend about the longitudinal axis X-X with a non-axisymmetric form, that is, a form such that the longitudinal axis X-X is not orthogonal to the plane passing through all the points forming the upstream end of the nacelle 1.

The nacelle 1 also comprises an intake lip 10 defining an air intake 100 through which air can be admitted within the gas turbine engine. At an upstream end of the nacelle 1 the intake lip 10 joins an internal wall 12 of the nacelle 1 in contact with the airflow admitted within the gas turbine engine, with an external wall 14 of the nacelle 1, in contact with the air circulating around the gas turbine engine.

Throughout the following, the upstream and the downstream are defined relative to the direction of airflow within the gas turbine engine. Also, "axial" defines a direction substantially parallel to the longitudinal axis X-X, and "radial" defines a direction substantially orthogonal to said longitudinal axis X-X.

The nacelle 1 generally encloses an engine body 2 of the gas turbine engine, at the upstream of which a fan 20 extends. When operating, the fan 20 sucks the admitted airflow via the air intake 100, and propels it inside the engine body 2. As seen in FIG. 1, the fan 20 has a diameter D, and the air intake 100 has a length L defined as the distance separating an upstream end of the intake lip 10 from an upstream end of the fan 20. More precisely, as illustrated in FIG. 1, the length L corresponds to the distance between a leading edge of a blade root of the fan 20 and the intersection between the longitudinal axis X-X with the air capture plane, that is, the plane passing through the ends of the intake lip 10; this distance being taken along the longitudinal axis X-X. In other terms, the length L corresponds to the distance between a leading edge of a root of a blade of the fan 20 and a plane orthogonal to the leading edge of the intake lip 10 taken in the region of a median plane of the nacelle 1 which contains the longitudinal axis X-X and which is orthogonal to a plane of symmetry of the nacelle 1, that is, a plane which through the azimuths 90° and 270° of the air intake 100. In a preferred embodiment, the nacelle 1 has dimensions such that a ratio of the length of the air intake L to the diameter of the fan D is between 0.15 and 0.25, and is preferably 0.19. In such an embodiment, the aerodynamic properties of the gas turbine engine are optimised especially with minimised drag relative to the main frame of the engine body 2, that is, relative to the dimensions of the engine body 2.

Device for Modifying Geometry of the Air Intake

A device for modifying the geometry of the air intake 3 due to which the nacelle 1 can have at least two configurations illustrated especially in FIGS. 2 to 8, 10 to 14, and 16.

In a first configuration, illustrated in FIGS. 2, 4, 5, 7 and 11, the geometry of the air intake 100 is particularly adapted to conditions of cruise flight, at high forward speed of the aircraft to which the nacelle 1 is fixed, causing a high speed of airflow infinitely upstream of the nacelle 1. This geometry of the first configuration in fact has a very uniform flow in the region of the air intake 100. In this first configuration, the device for modifying the geometry of the air intake 3 is in a retracted or fallback position.

In a second configuration, illustrated in FIGS. 3, 8, 10, 12 to 14, and 16, the geometry of the air intake 100 is particularly adapted to conditions for take-off flight, landing and/or at ground level, lower airflow speed. This geometry of second configuration offers a wider air aspiration surface, and shifts the stopping point of the flow entering downstream of the air intake 100 so as to reduce the bypassing of the intake lip 10 by the flow. Also, it minimises distortions in the flow of the airflow in the region of the air intake, especially in conditions of crosswinds, or high-impact winds. In this second configuration, the device for modifying the geometry of the air intake 3 is in a deployed position.

In any case, the device for modifying the geometry of the air intake 3 improves the capacity of the nacelle 1 in reducing distortion of the admitted airflow in the region of the air intake 100, which especially improves the aerodynamic performance of the fan 20.

As seen more precisely in FIGS. 4 to 8, 10 to 14 and 16, the device for modifying the geometry of the air intake 3 comprises a first slat 30 and a second slat 32. As seen in these figures, the first slat 30 and the second slat 32 are mobile in translation relative to the nacelle 1, according to the longitudinal axis X-X, between:

a first configuration, illustrated in FIGS. 2, 4, 5, 7 and 11, where:
the first slat 30 forms the intake lip 10, and
the second slat 32 extends inside the nacelle 1, and a second configuration, illustrated in FIGS. 3,8, 10, 12 to 14, and 16, where:
the first slat 30 extends at a distance from the intake lip 10, and
the second slat 32 forms the intake lip 10, In the first configuration, the second slat 32 remains inside the nacelle 1, without interaction with the airflow circulating around the intake lip 10, that is, in a confined way.

In the second configuration, the first slat 30 and the second slat 32 define an airflow channel 34 between a downstream surface of the first slat 30 and an upstream surface of the second slat 32.

In this way, in the first configuration, the air intake 100 has a nominal geometry, that is, particularly adapted to conditions of cruise flight, at high airflow speed, and, in the second configuration, the geometry of the air intake 100 is modified so as to be particularly adapted to conditions of take-off flight and/or at ground level, at lower airflow speed. The first configuration and the second configuration of the first slat 30 and of the second slat 32 correspond respectively to the retracted position and to the deployed position of the device for modifying the geometry of the air intake 3.

In reference to FIGS. 3, 7 to 9, 13, 15 and 17, the device for modifying the geometry of the air intake 3 can also comprise a guide rod 36 connecting the first slat to the second slat 32, such that over at least one angular portion of the device for modifying the geometry of the air intake 3 the first slat 30 is mounted fixed relative to the second slat 32. This however is not limiting, since the first slat 30 and the second slat 32 cannot be mounted fixed relative to each other, over another angular portion of the device for modifying the geometry of the air intake 3 where for example the first slat and the second slat are connected by a telescopic guide rod 36, such that movement of the first slat 30 is independent of the movement of the second slat 32. In this way, it is possible to adapt the width of the airflow channel 34 as a function of flight conditions, and maintain the continuity of the junction between the second slat 32 and the internal wall 12

Figure 13:
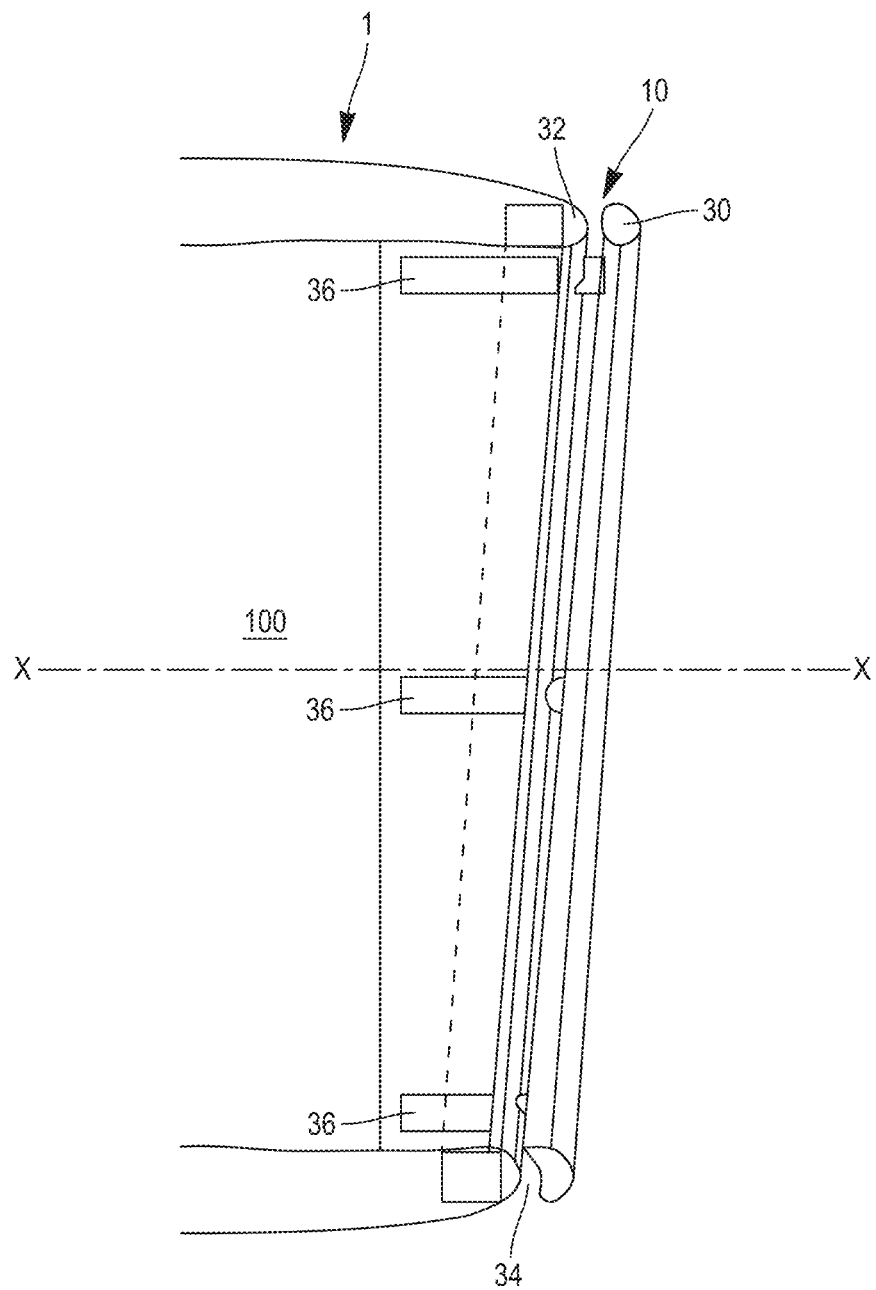
FIG. 13 is a perspective side view of an eighth embodiment of an assembly for a gas turbine engine according to the invention.

Advantageously, as seen in FIG. 13, the guide rod 36 extends parallel to the longitudinal axis X-X, so as to facilitate movements of deployment and stowage of the slats 30, 32 within the nacelle 1.

Advantageously also, as seen in FIGS. 9, 13, 15 and 17, the device for modifying the geometry of the air intake 3 comprises a plurality of guide rods 36, distributed around the longitudinal axis X-X, for example evenly spaced in an azimuthal manner. In this way, the device for modifying the geometry of the air intake 3 has a heightened robustness, and movements of deployment and stowage of the slats 30, 32 within the nacelle 1 can be performed rapidly and precisely.

Figure 4:
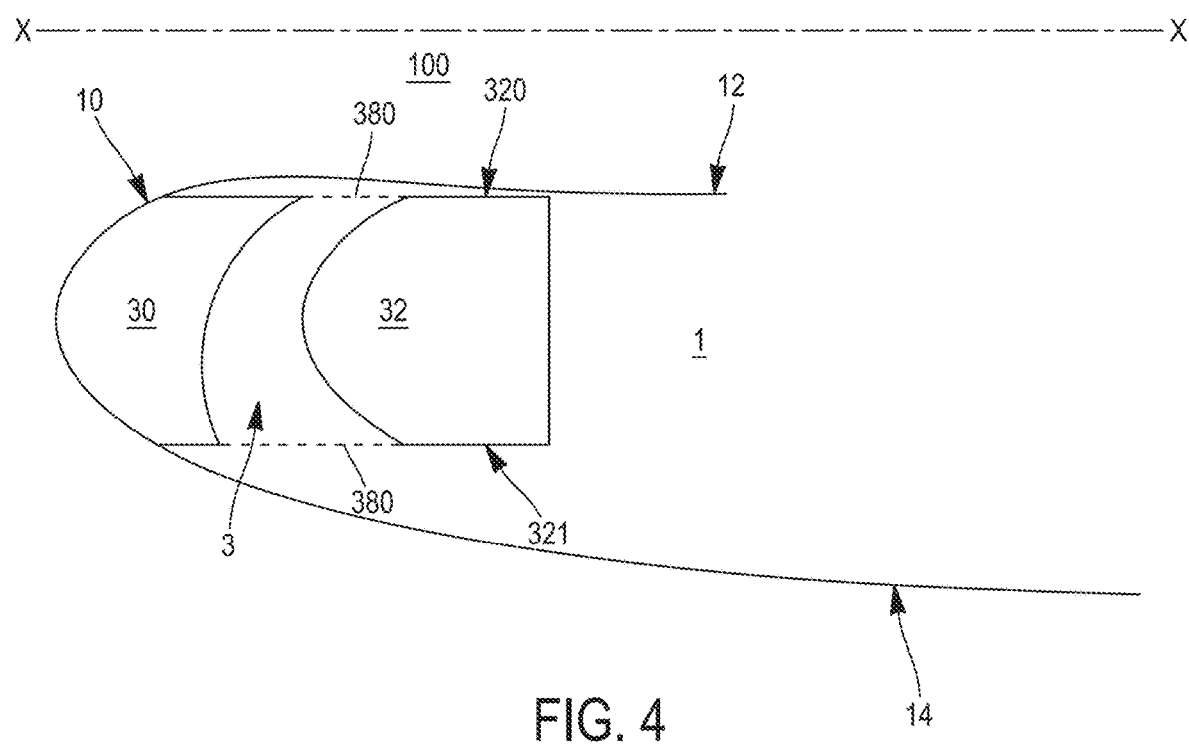
FIG. 4 is a sectional view of part of a second embodiment of an assembly for a gas turbine engine according to the invention in a first configuration.

In an embodiment, an anti-icing system of the first slat 30 and/or of the second slat 32 is provided. In fact, at high altitude the risk of icing is particularly high in the region of the intake lip 10. Such a system therefore ensures proper operation of the device for modifying the geometry of the air intake 3. Advantageously, the anti-icing system comprises an anti-icing fluid circulation channel which extends at least in part inside a guide rod 36. The guide rod 36 can therefore be at least partially hollow so as to convey the anti-icing fluid, for example hot air. This especially ensures anti-icing of the first slat 30 and/or of the second slat 32 irrespective of the configuration of the device for modifying the geometry of the air intake 3. In this respect, an embodiment where the first slat 30 is mounted fixed relative to the second slat 32, as seen especially in FIG. 4, is particularly advantageous. In fact, the presence of icing on the upstream surface of the second slat 32 does not prevent retraction of the device for modifying the geometry of the air intake 3.

Figure 7:
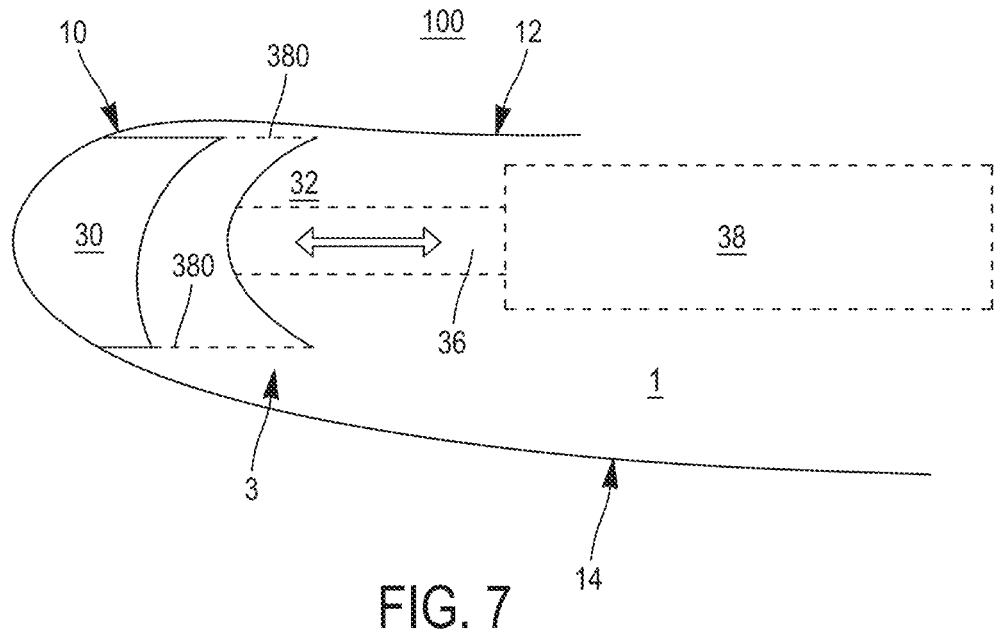
FIG. 7 is a sectional view of part of a fourth embodiment of an assembly for a gas turbine engine according to the invention in a first configuration.
Figure 8:
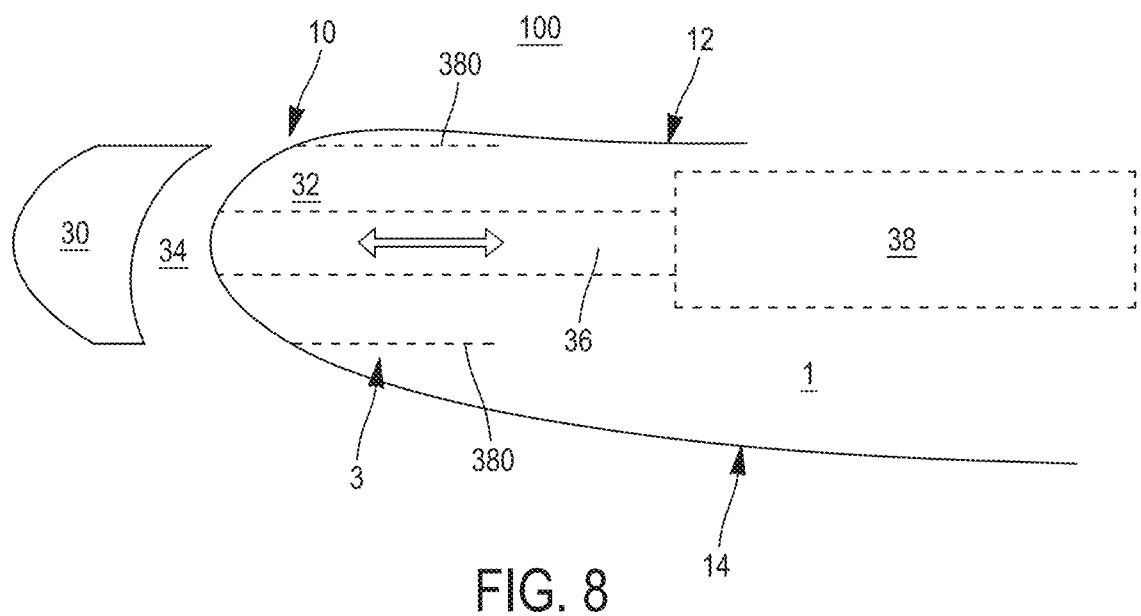
FIG. 8 is a sectional view of part of the fourth embodiment of an assembly for a gas turbine engine illustrated in FIG. 7 in a second configuration.
Figure 9:
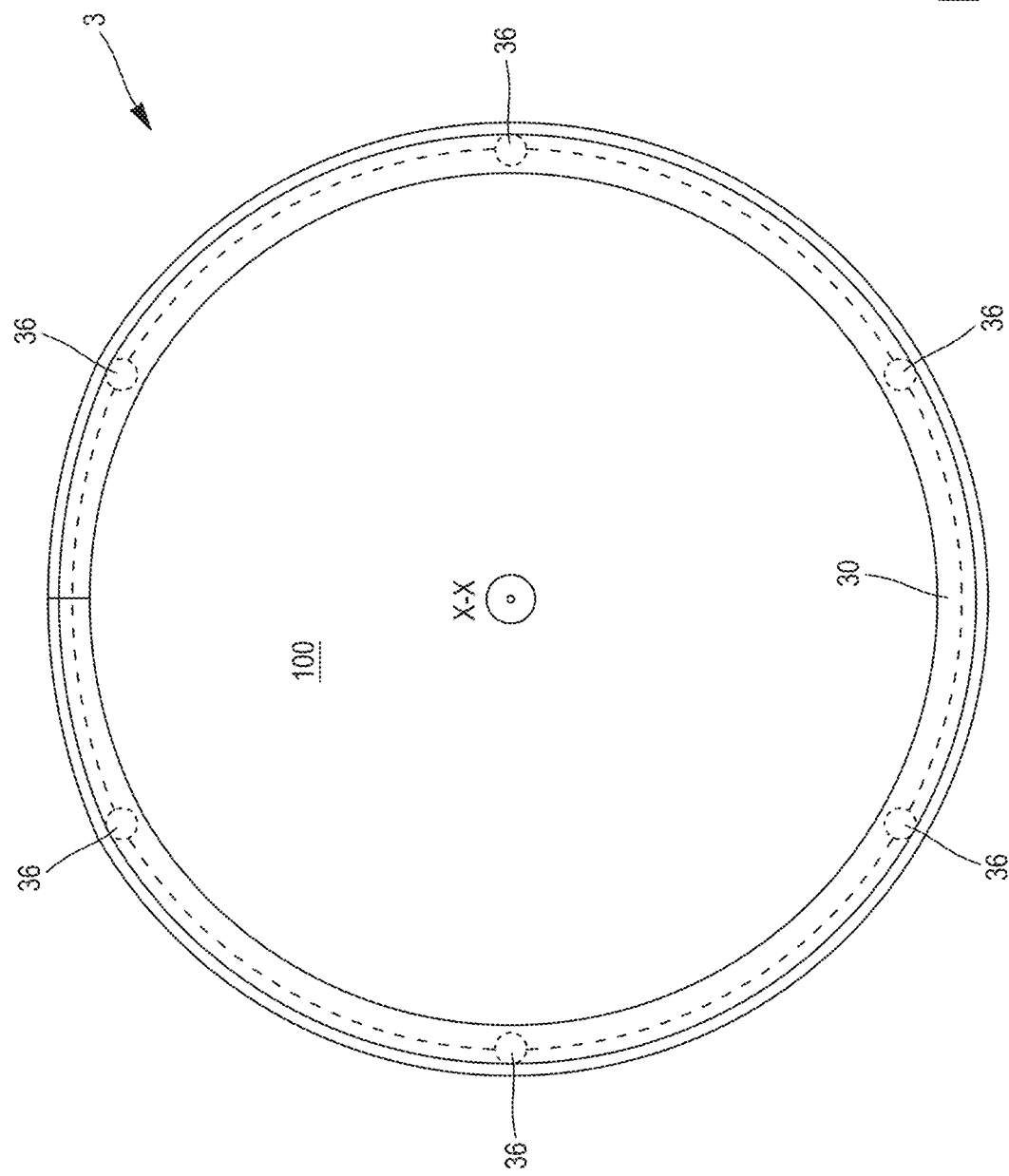
FIG. 9 is a frontal view of a fifth embodiment of an assembly for a gas turbine engine according to the invention.

In reference to FIGS. 7 and 8, the device for modifying the geometry of the air intake 3 can also comprise an actuator 38, configured to be lodged in the nacelle 1. The actuator 38 is also configured to set in motion the first slat 30 and/or the second slat 32, between the first configuration and the second configuration.

Advantageously, the actuator 38 is configured to set in motion the guide rod 36, so as to shift from the first configuration to the second configuration, and vice versa.

Figure 5:
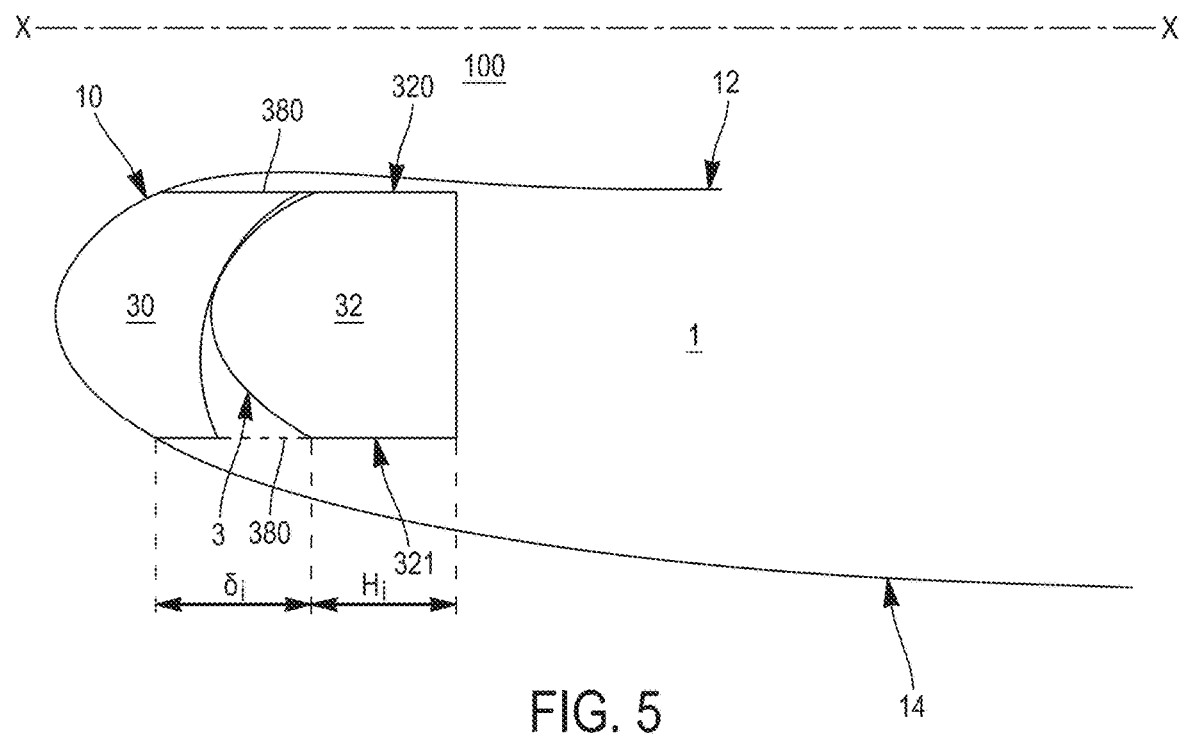
FIG. 5 is a sectional view of part of a third embodiment of an assembly for a gas turbine engine according to the invention in a first configuration

In any case, in reference to FIGS. 4 to 8, 10 to 12, 14 and 16, a rail 380 extends parallel to the longitudinal axis X-X and is configured to guide the first slat 30 and/or the second slat 32 in translation. In this case, the first slat 30 and/or the second slat 32 can advantageously be mounted in translation on the rail(s) 380. As seen in FIG. 5, the rail 380 has an axial length $\delta_l$. As seen also in FIG. 10, for reasons of bulk, the axial length $\delta_l$ of the rails 380 is preferably less than or equal to the distance separating the entry neck from the air intake end of divergence 100.

Figure 6:
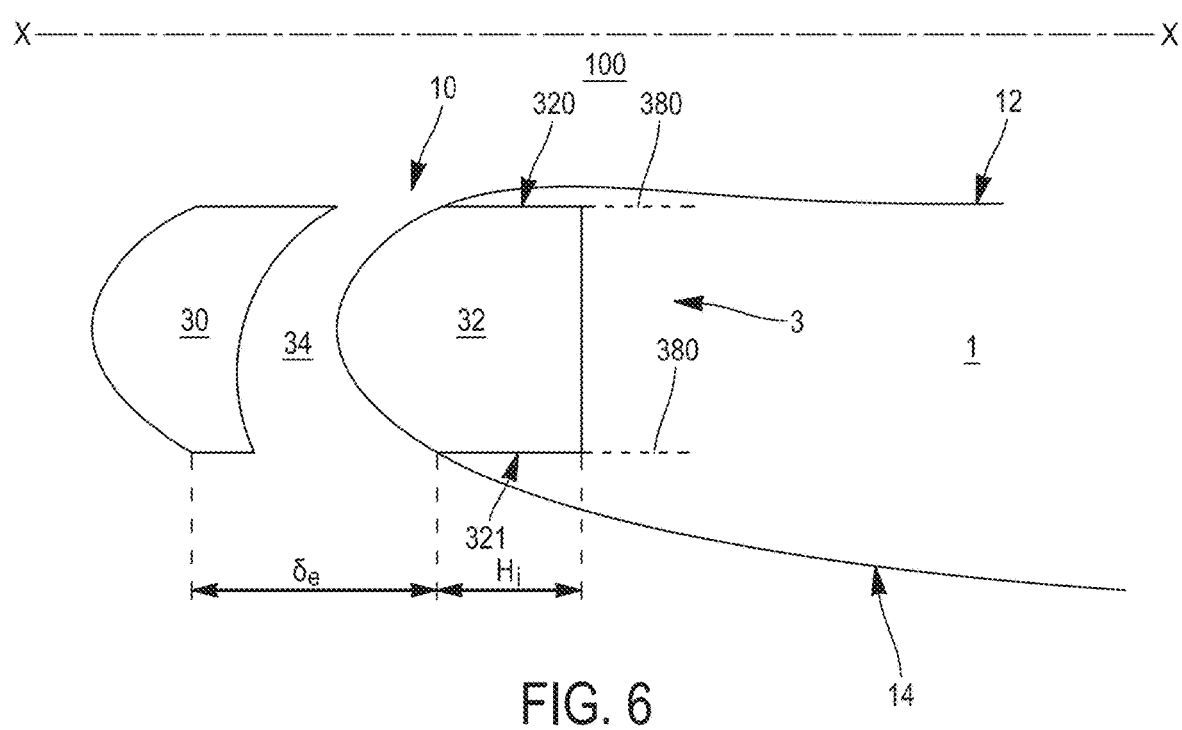
FIG. 6 is a sectional view of part of the second embodiment of an assembly for a gas turbine engine illustrated in FIG. 4, in a second configuration.
Figure 10:
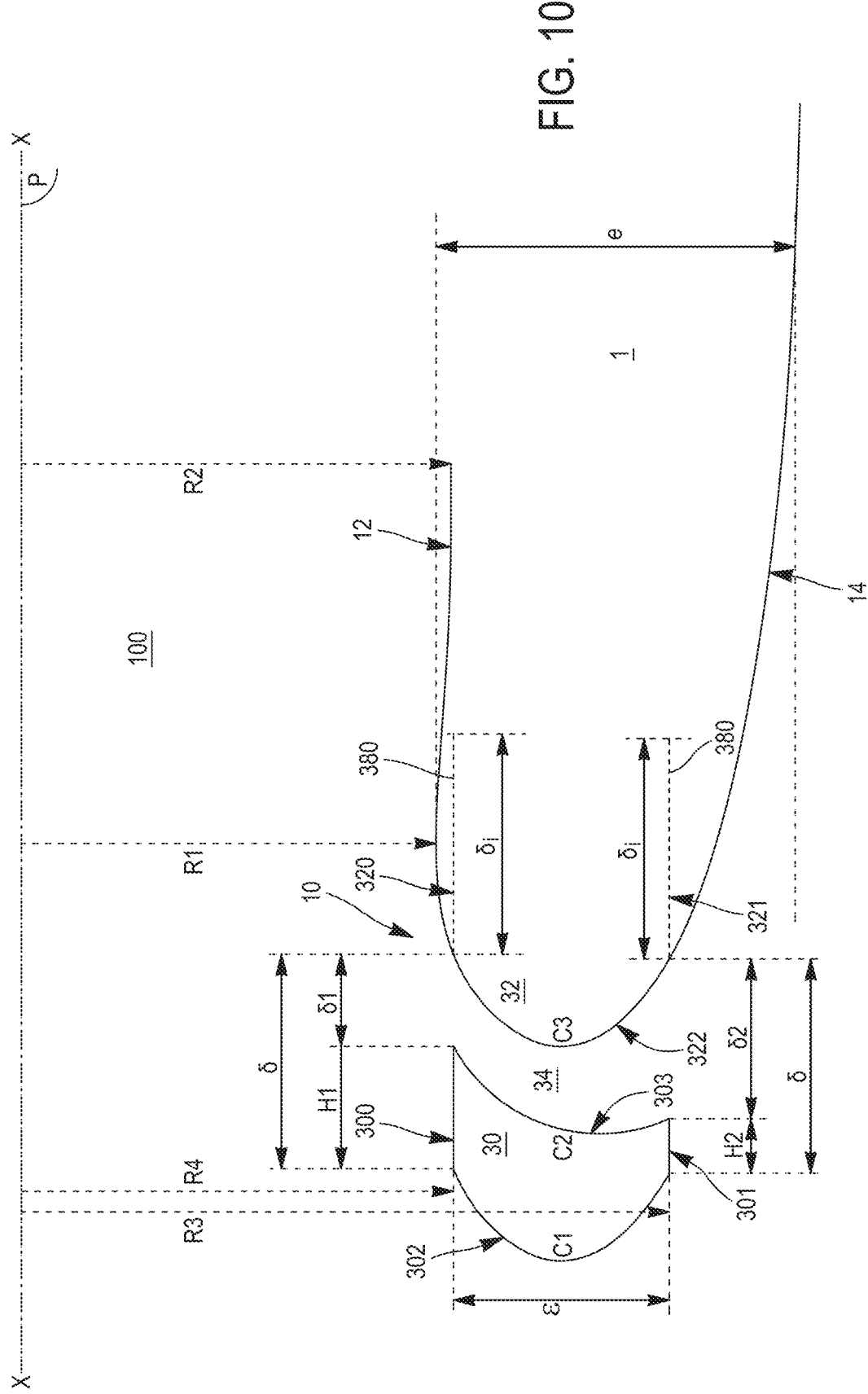
FIG. 10 is a sectional view of part of a sixth embodiment of an assembly for a gas turbine engine according to the invention in a second configuration.
Figure 11:
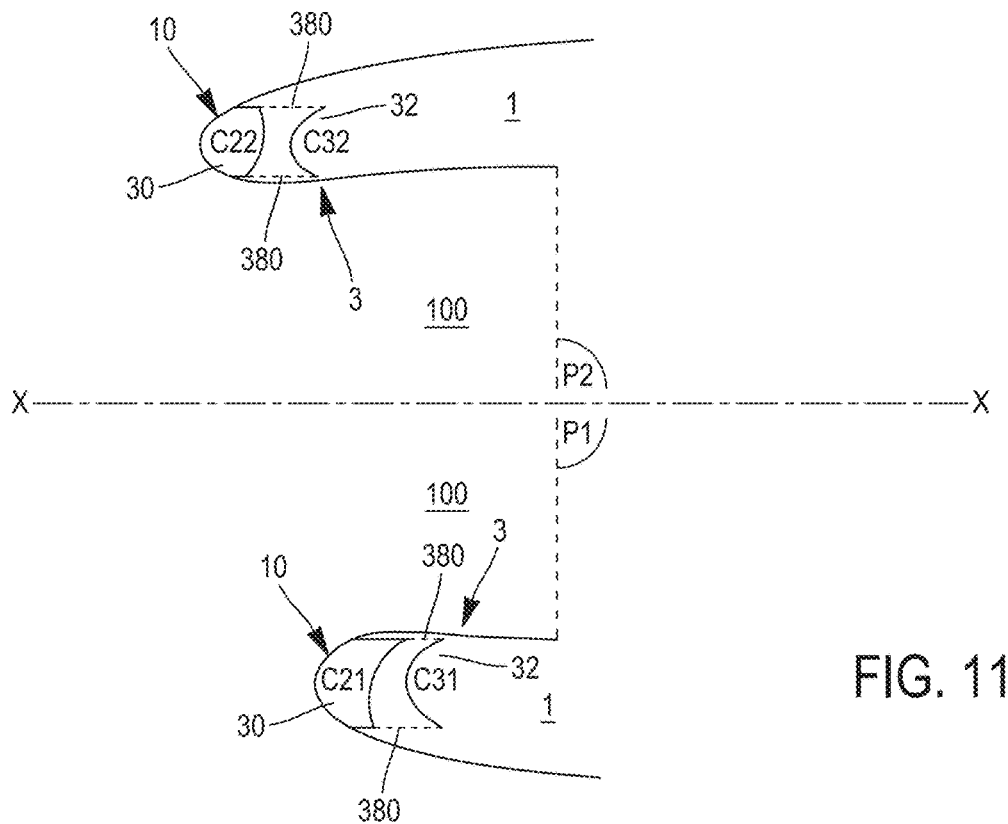
FIG. 11 is a sectional view of part of a seventh embodiment of an assembly for a gas turbine engine according to the invention in a first configuration.

The actuator 38 can be pneumatic. In this case, it is possible to couple the anti-icing system of the nacelle 1, for example hot air system, with the actuator 38. The presence of an actuator 38 to ensure deployment and/or stowage of the device for modifying the geometry of the air intake 3 is however not obligatory, as seen in FIGS. 4 to 6. In fact, given the structure of the device for modifying the geometry of the air intake 3, its deployment and/or its stowage can be performed automatically as follows:

at high airflow speed, dynamic pressure ad infinitum upstream of the gas turbine engine generates axial force towards downstream which naturally pushes back the device for modifying the geometry of the air intake 3 into its retracted position, which corresponds to the first configuration illustrated in FIGS. 4, 7 and 11, and at low forward speed of the aircraft on which the gas turbine engine is mounted, and at high flow of air admitted by the gas turbine engine (e.g. at take-off), acceleration of the flow during bypassing of the intake lip 10 creates a pressure field around said intake lip 10 which generates axial force directed towards upstream; this force naturally deploys the device for modifying the geometry of the air intake 3, as seen in FIG. 6, and keeping it in deployed position, which corresponds to the second configuration illustrated in FIGS. 8, 10, 12 to 14, and 16.

It is therefore possible, alternatively or in addition to the actuator 38, to provide a locking device configured to immobilize the device for modifying the geometry of the air intake 3 in the first configuration and/or in the second configuration, deployment and stowage also able to be naturally ensured by the high-speed and/or low-speed airflow. In this way, the device for modifying the geometry of the air intake 3 has considerable robustness, and it is no longer necessary to provide safety devices to rectify any malfunction of the actuator 38.

Geometry of the First Slat, Second Slat, and Airflow Channel

In reference to FIG. 10, the geometry of the first slat 30, of the second slat 32, and of the airflow channel 34, will now be described in more detail. FIG. 10 is a sectional view of the device for modifying the geometry of the air intake 3 according to a radial plane P relative to the longitudinal axis X-X, that is, in a plane P comprising the longitudinal axis X-X.

As seen in FIG. 10, the nacelle 1 defines:

a first radius R1 which corresponds to the radius of the entry neck, that is, to the distance separating a surface of the internal wall 12 of the nacelle 1 which is the closest to the longitudinal axis X-X, from said longitudinal axis X-X, a second radius R2 which corresponds to the radius of end of divergence of the air intake 100, that is, to the distance separating a surface of the internal wall 12 from the nacelle 1 which is the farthest away from the longitudinal axis X-X, from said longitudinal axis X-X, and a thickness e of intake lip 10, which corresponds to the distance separating the surface of the internal wall 12 from the nacelle 1 which is the closest to the longitudinal axis X-X of a surface of the external wall 14 of the nacelle 1 the farthest away from said longitudinal axis X-X.

As seen in FIG. 10, the first slat 30 defines a third radius R3 which corresponds to the distance separating the longitudinal axis X-X of an external radial face 301 from the first slat 30, and a fourth radius R4 which corresponds to the distance separating the longitudinal axis X-X from an internal radial face 300 of the first slat 30.

Also, the first slat 30 defines an upstream profile of the first slat C1. This upstream profile of the first slat C1 forms an upstream surface of the first slat 302, which is three-dimensional in revolution about the longitudinal axis X-X. A section of the upstream profile of the first slat C1 in the radial plane P forms a geometric line connecting a geometric line formed by the section, in the radial plane P, of the internal radial face 300 of the first slat 30 to a geometric line formed by the section, in the radial plane P, of the external radial face 301 of the first slat 30, upstream of the first slat 30. This geometric line can be defined by any curve passing through the geometric line formed by the section, in the radial plane P, of the internal radial face 300 of the first slat 30 and by geometric line formed by the section, in the radial plane P, of the external radial face 301 of the first slat 30, upstream of the first slat 30. According to the form of the upstream surface of the first slat 302, the upstream profile of the first slat C1 can have a different form of geometric line in another radial plane P', which also comprises the longitudinal axis X-X and which is different to the radial plane P.

Also, the first slat 30 defines a downstream profile of the first slat C2. This downstream profile of the first slat C2 forms a downstream surface of the first slat 303, which is three-dimensional in revolution about the longitudinal axis X-X. A section of the downstream profile of the first slat C2 in the radial plane P forms a geometric line connecting a geometric line formed by the section, in the radial plane P, of the internal radial face 300 of the first slat 30 to a geometric line formed by the section, in the radial plane P, of the external radial face 301 of the first slat 30, downstream of the first slat 30. This geometric line can be defined by any curve passing through the geometric line formed by the section, in the radial plane P, of the internal radial face 300 of the first slat 30 and by the geometric line formed by the section, in the radial plane P, of the external radial face 301 of the first slat 30, downstream of the first slat 30. According to the form of the downstream surface of the first slat 303, the downstream profile of the first slat C2 can have a different form of geometric line in another radial plane P', which also comprises the longitudinal axis X-X and which is different to the radial plane P.

Also, the first slat 30 defines a radial span ε corresponding to the difference between the third radius R3 and the fourth radius R4, that is, to the distance separating the internal radial face 300 of the first slat 30 from its external radial face 301. The radial span ε is limited by the thickness e of the intake lip 10 so that it can easily deploy and stow the device for modifying the geometry of the air intake 3. Preferably, a ratio of the radial span ε of the first slat 30 over the thickness e of intake lip 10 is between 0.4 and 0.6. In any case, the internal radial face 300 of the first slat extends as closely possible to the longitudinal axis X-X, that is, substantially in the same plane as the surface of the internal wall 12 of the nacelle 1 which is the farthest away from the longitudinal axis X-X, as seen in FIG. 10. In this way, the airflow channel 34 terminates as closely as possible to the external radial face of the airflow penetrating within the air intake 100. In this way, in the second configuration the added airflow injected by the airflow channel 34 has current lines which are the most parallel possible to the current lines of said airflow penetrating within the air intake 100.

Also, the first slat 30 defines a length of the internal radial face of the first slat H1, corresponding to the distance separating the internal radial end of the upstream profile of the first slat C1 from the internal radial end of a downstream surface of the first slat 30. As seen in FIG. 10, the length of the internal radial face of the first slat H1 is dimensioned such that said internal radial face 300 can act as guide as it shifts from the first configuration to the second configuration, and vice versa. Also, the length of the internal radial face of the first slat H1 is dimensioned so as to guarantee the tightness of the device for modifying the geometry of the air intake 3 in retracted position, by contact with the internal wall 12 of the nacelle 1. This especially conserves the same aerodynamic performances, irrespective of the configuration of the device for modifying the geometry of the air intake 3, that is, in deployed position, in retracted position, or in an intermediate position between these two positions.

Also, the first slat 30 defines a length of the external radial face of the first slat H2, corresponding to the distance separating the external radial end of the upstream profile of the first slat C1 from the external radial end of a downstream surface of the first slat 30. As seen in FIG. 10, the length of the external radial face of the first slat H2 is dimensioned such that said external radial face 301 can act as guide as it shifts from the first configuration to the second configuration, and vice versa. Also, the length of the external radial face of the first slat H2 is dimensioned so as to guarantee the tightness of the device for modifying the geometry of the air intake 3 in retracted position, by contact with the external wall 14 of the nacelle 1. This especially conserves the same aerodynamic performances, irrespective of the configuration of the device for modifying the geometry of the air intake 3, that is, in deployed position, in retracted position, or in an intermediate position between these two positions.

Finally, in reference to FIGS. 4 to 6, the second slat 32 defines a length $H_i$ of the internal radial face 320 of the second slat 32, corresponding to the distance separating the internal radial end of the upstream profile of the second slat C3 from the internal radial end of a downstream surface of the second slat 32. This length $H_i$ is also equal to the length of the external radial face 321 of the second slat 32, corresponding to the distance separating the external radial end of the upstream profile of the second slat C3 of the external radial end of a downstream surface of the second slat 32. As seen in these figures, the length of the internal and/or external radial face of the second slat $H_i$ is dimensioned so that it can act as guide as it shifts from the first configuration to the second configuration, and vice versa. Also, the length of the internal radial face and/or external of the second slat $H_i$ is dimensioned so as to guarantee the tightness of the device for modifying the geometry of the air intake 3 in retracted position, by contact with the internal wall 12 of the nacelle 1. This especially conserves the same aerodynamic performances, irrespective of the configuration of the device for modifying the geometry of the air intake 3, that is, in deployed position, in retracted position, or in an intermediate position between these two positions As also seen in FIG. 10, the second slat 32 also has an upstream profile of the second slat C3. This upstream profile of the second slat C3 forms an upstream surface of the second slat 322, which is three-dimensional in revolution about the longitudinal axis X-X. A section of the downstream profile of the first slat C2 in the radial plane P forms a geometric line connecting a geometric line formed by the section, in the radial plane P, of the internal radial face 320 of the second slat 32 to a geometric line formed by the section, in the radial plane P, of the external radial face 321 of the second slat 32. This geometric line can be defined by any curve passing through the geometric line formed by the section, in the radial plane P, of the internal radial face 320 of the second slat 32 and by the geometric line formed by the section, in the radial plane P, of the external radial face 321 of the second slat 32. According to the form of the upstream surface of the second slat 322, the upstream profile of the second slat C3 can have a different form of geometric line in another radial plane P', which also comprises the longitudinal axis X-X and which is different to the radial plane P.

In any case, the upstream profile of the second slat C3 has, in the second configuration, a tangential continuity with a profile of the nacelle 1 defined in the radial plane P. More precisely, as seen in FIG. 10, the nacelle 1 also has a profile in the radial plane P which takes the form of two geometric lines corresponding respectively to the internal wall 12 and to the external wall 14 of the nacelle 1. Now, at the intersection of the upstream profile of the second slat C3 with the profile of the nacelle 1, respectively in the region of the internal wall 12 and of the external wall 14, a local tangent of the upstream profile of the second slat C3 is combined with a local tangent of the nacelle profile 1. In other terms, in the second configuration, the second slat 32 exactly matches the respective rims of the internal wall 12 and of the external wall 14 of the nacelle 1 so as to offer no disruption to the airflow penetrating within the air intake 100. This ensures minimisation of additional disruptions of the airflow. This tangential continuity of second configuration is present in any radial plane, all around the longitudinal axis X-X.

In a preferred embodiment, for example illustrated in FIG. 10, the upstream profile of the first slat C1 is identical to the upstream profile of the second slat C3. More precisely, in any radial plane P the geometric line defining the upstream profile of the first slat C1 is identical to the geometric line defining the upstream profile of the second slat C3, that is, they can be superposed exactly over their entire length. In this way, the intake lip 10 has exactly the same form in the first configuration and in the second configuration.

Still in reference to FIG. 10, the channel flow 34 has, irrespective of the position of the device for modifying the geometry of the air intake 3:

an internal axial length δ1 defined as the distance separating the downstream end of the internal radial face of the first slat 300 from the upstream end of the internal radial face of the second slat 320, and an external axial length δ2 defined as the distance separating the downstream end of the external radial face of the first slat 301 from the upstream end of the external radial face of the second slat 321.

In an advantageous configuration of the device for modifying the geometry of the air intake 3, the internal axial length 61 of the airflow channel 34 is less than the external axial length δ2 of the airflow channel 34. This defines a convergent geometry of the airflow channel 34, as seen in FIG. 10.

Also, in an embodiment where the first slat 30 is mounted fixed relative to the second slat 32, as seen in FIG. 4, the internal axial length 61 and the external axial length δ2 are invariant irrespective of the position of the device for modifying the geometry of the air intake 3.

Also, the device for modifying the geometry of the air intake 3 has, irrespective of its position, an axial span δe defined as the sum of:
the length of the internal radial face of the first slat H1 and of the internal axial length of flow channel δ1, or
the length of the external radial face of the first slat H2 and of the external axial length of flow channel δ2.

From this, the device for modifying the geometry of the air intake 3 defines a maximal axial span δ as the largest of the distance separating the external radial end of the upstream profile of the first slat C1 from the external radial end of the upstream rim of the internal wall 12 of the nacelle 1, and of the distance separating the internal radial end of the upstream profile of the first slat C1 from the internal radial end of the upstream rim of the internal wall 12 of the nacelle 1, when the device for modifying the geometry of the air intake 3 is in deployed position. In other words, the maximal axial span δ corresponds to the axial span δe of the device for modifying the geometry of the air intake 3 when it is in deployed position.

The space available for extension of the device for modifying the geometry of the air intake 3 is limited within the nacelle 1, when said device for modifying the geometry of the air intake 3 is in the first configuration, that is, in retracted position. In this way, the length axial $δ_i$ of the rails 380 is preferably equal to the axial span δe in retracted position, and in any case is not less than the axial span $δ_e$.

In any case, the internal axial length of the airflow channel δ1 and the external axial length of the airflow channel δ2 are each less than the axial span $δ_e$ of the device for modifying the geometry of the air intake 3. Also, they are each advantageously non-zero to guarantee the existence of the airflow channel 34. Also, in an embodiment where the first slat 30 and the second slat 32 can be set in axial motion independently of each other, the internal axial length of the airflow channel δ1 and the external axial length of the airflow channel δ2 can take on a minimal value which depends on the point of contact between the first slat 30 and the second slat 32. This is especially apparent in FIG. 5. As evident in this figure, this allows an advantageous space gain in retracted position.

The airflow channel 34 has therefore, in the radial plane P:
an upstream profile, corresponding to the downstream profile of the first slat C2, and
a downstream profile, corresponding to the upstream profile of the second slat C3.

Advantageously, the airflow channel 34 can have a different geometry about the longitudinal axis X-X. In other words, as evident especially in FIGS. 11 and 12, the airflow channel 34 has:
in a first radial plane P1:
a first upstream profile, corresponding to a first downstream profile of the first slat C21, and
a first downstream profile, corresponding to a first upstream profile of the second slat C31, and
in a second radial plane P2:
a second upstream profile, corresponding to a second downstream profile of the first slat C22, and
a second downstream profile, corresponding to a second upstream profile of the second slat C32.

Figure 12:
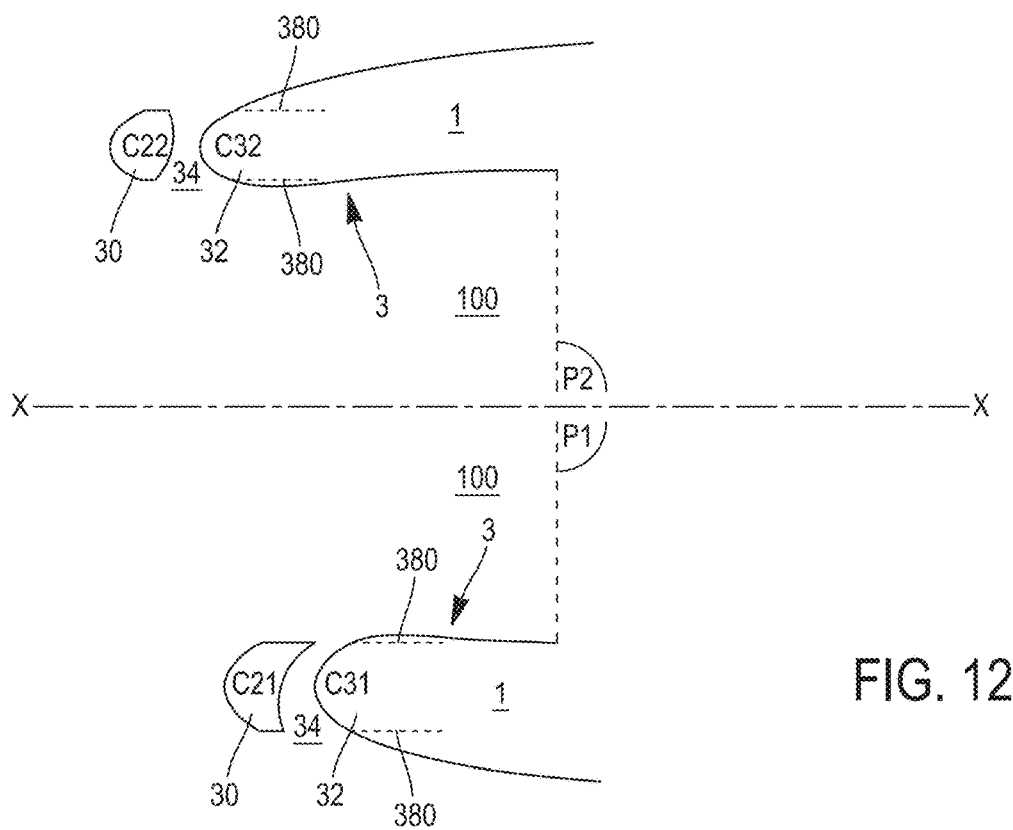
FIG. 12 is a sectional view of part of the seventh embodiment of an assembly for a gas turbine engine illustrated in FIG. 11 in a second configuration.

More precisely, since the second upstream profile of the second slat C32 is different to the first upstream profile of the second slat C31, and/or the second downstream profile of the first slat C22 is different to the first downstream profile of the first slat C21, as seen in FIGS. 11 and 12, the airflow channel 34 has, in the first radial plane P1, a first longitudinal section, and in the second radial plane P2, a second longitudinal section, the second longitudinal section being different to the first longitudinal section. "Longitudinal" section means a section of the airflow channel 34 according to a radial plane relative to the longitudinal axis X-X.

FIGS. 11 to 13 illustrate longitudinal sections different to the airflow channel 34 respectively in the first configuration of device for modifying the geometry of the air intake 3, and in the second configuration of said device 3. In each of these figures it is clear that a first longitudinal section is convergent in a first radial plane P1, that is, the airflow channel 34 narrows as and when it comes more closely to the longitudinal axis X-X, while a second longitudinal section is convergent-divergent in a second radial plane P2, that is, the airflow channel 34 first narrows as it comes more closely to the longitudinal axis X-X, then increases again until it terminates in the air intake 100.

This locally optimises the aerodynamic effect of modification of the geometry of the air intake 100. This possibility is especially advantageous when the nacelle 1 is not axisymmetric, as seen in FIGS. 12 to 13. In fact, it is possible to compensate the asymmetry of the nacelle 1 by modification of the flow of the airflow admitted via the air intake 100, due to upstream profiles and/or downstream profiles of the airflow channel 34 which define convergent and/or convergent-divergent sections of the airflow channel 34, according to their azimuthal position about the longitudinal axis X-X. For example, at take-off the stopping point of the flow is generally located outside the nacelle 1, and the airflow bypasses the intake lip 10 from the outside to the inside over the entire circumference of the nacelle 1. But when the longitudinal axis X-X is inclined relative to the horizontal (that is, the aircraft takes on an impact), the stopping point can be more towards the inside of the nacelle 1 in the second radial plane P2, but outside in the first radial plane P1. The different form in the two radial plans P1 and P2 allows the flow to bypass the intake lip 10 in both directions in the second radial plane P2, whereas in the first radial plane P1 the flow always bypasses the intake lip 10 in the same direction.

In this way, it is possible to define a degree of geometric convergence of the airflow channel 34. More precisely, assuming that the internal radial surface A1 and the external radial surface A2 of the airflow channel 34 are generatrices of a cylinder with circular base, a rate of convergence r of the airflow channel 34 can be defined as the ratio of the internal radial surface A1 of the airflow channel 34 over the external radial surface A2 of the airflow channel 34:

$$r = \frac{A1}{A2} = \frac{2\pi R4 \delta 1}{2\pi R3 \delta 2} = \frac{R4 \delta 1}{R3 \delta 2}$$

To the extent where the ratio of the third radius R3 on the fourth radius R4 is always greater than 1, the airflow channel 34 is naturally convergent. But the ratio of the internal axial length δ1 of the airflow channel 34 over its external axial length δ2 influences the rate of convergence r. In fact, this ratio is:

$$\frac{\delta 1}{\delta 2} = \frac{\delta - H1}{\delta - H2}$$

In this way, the convergence can be defined by the respective choice of the length of the internal radial face of the first slat H1 and of the length of the external radial face of the first slat H2, which are also each limited by the axial span δ of the device for modifying the geometry of the air intake 3.

In the second configuration the airflow channel 34 provides additional modification of quantity of movement within the fluid admitted via the air intake 100. This modification can consist of acceleration or deceleration of the fluid admitted. At low flow speed, typically in the subsonic field, acceleration is generally preferred and the rate of convergence r should then be under 1, that is, the longitudinal section of the airflow channel 34 is convergent. In any case, the structure of the device for modifying the geometry of the air intake 3 allows both considerable rates of convergence τ, that is, close to 0, but also very low, that is, close to 1, or even divergences, that is, when the rate of convergence τ is above 1.

Embodiments of the Device for Modifying the Geometry of the Air Intake

In an embodiment where a first longitudinal section of the airflow channel 34, in a first radial plane P1, is different to a second longitudinal section, in a second radial plane P2, the axial span δ of the device for modifying the geometry of the air intake 3 is the same in the first plane P1 and in the second plane P2, as evident for example in FIGS. 11 and 12. This guarantees simple rectilinear translation of the device for modifying the geometry of the air intake 3.

As seen in FIGS. 9, 13, 15 and 17, in an embodiment the first slat 30 and the second slat 32 have a symmetry of revolution about the longitudinal axis X-X, in at least one given angular sector. This allows easy execution of deployment and stowage of the device for modifying the geometry of the air intake 3, and ensures compactness of the nacelle 1 both in the first configuration and in the second configuration. Also, this minimises disruptions within the flow admitted via the air intake 100. In any case, the upstream profiles C1, C3 of the slats 30, 32 may or may not exhibit a symmetry of revolution about the longitudinal axis X-X in at least one given angular sector. The deployment and stowage of the device for modifying the geometry of the air intake 3 in all cases are facilitated by the fact that the radial internal faces 300, 320 and external faces 301, 321 of the slats 30, 32 are generatrices of a cylinder of revolution about the longitudinal axis X-X, which is also the direction of deployment and stowage.

However, the different angular portions of the first slat 30 and/or of the second slat 32 can be shifted between the first configuration and the second configuration, and vice versa, independently of each other. In other words, the device for modifying the geometry of the air intake 3 can comprise a plurality of first slats 30 connected to a plurality of second slats 32, each extending according to an angular portion about the longitudinal axis X-X, and each being mobile in translation between a first configuration and a second configuration. In this way, a first slat 30 and a second slat 32 can be in the first configuration, while another first slat 30 and another second slat 32 are in the second configuration. This ensures a modularity of use of the device for modifying the geometry of the air intake 3, according to the different flows admitted within the air intake 100. Advantageously, the plurality of first slats 30 and the plurality of second slats can also have upstream profiles C1, C3 and downstream profiles C2 which are different to each other.

In reference to FIGS. 14 to 17, it is possible that the presence of an airflow channel 34 is unnecessary, or even unwanted, for angular portions of the air intake 100, typically the upper azimuthal portion, as illustrated in FIGS. 14 to 17. In fact, the presence of the airflow channel 34 could generate aerodynamic perturbations adding to the strong impacts within the flow in the region of these portions of air intake 100.

Figure 14:
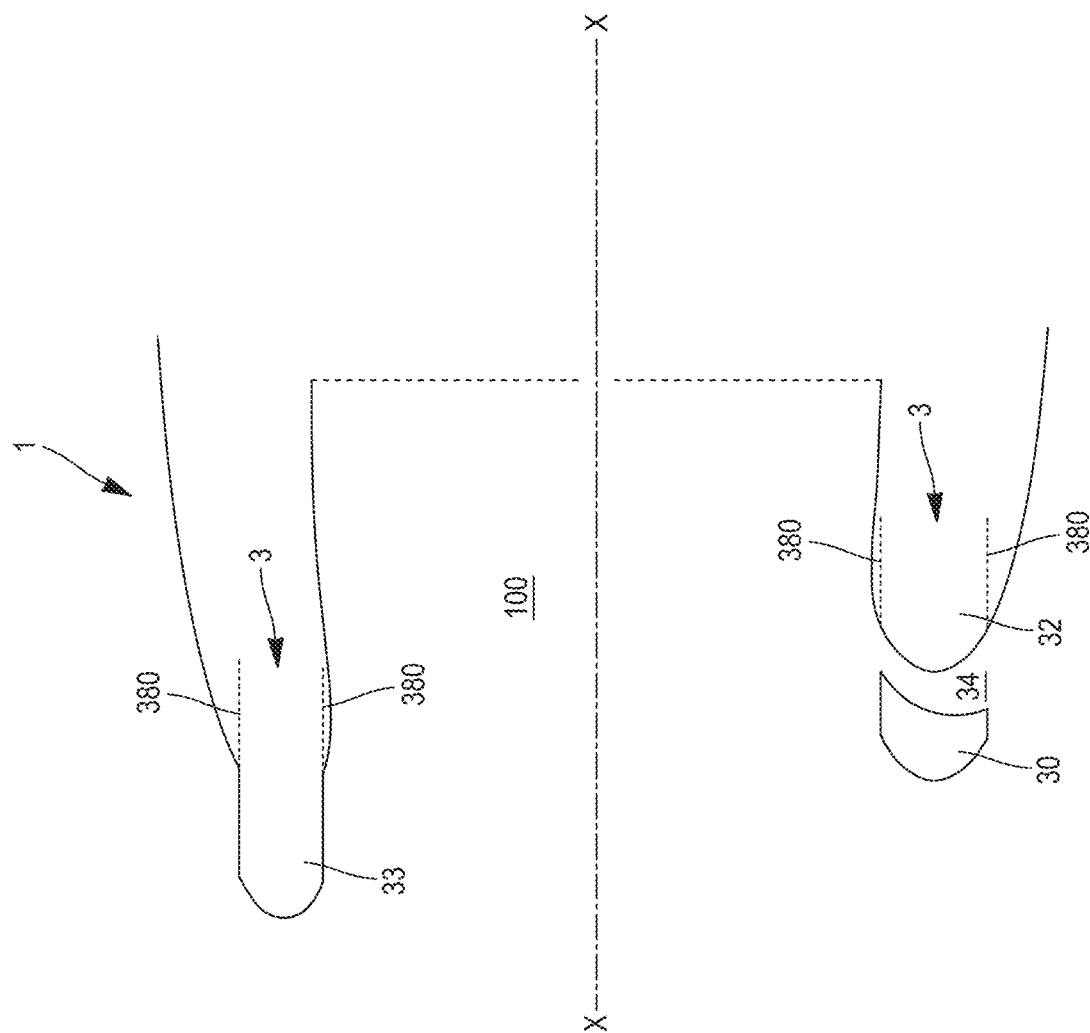
FIG. 14 is a sectional view of a ninth embodiment of an assembly for a gas turbine engine according to the invention.
Figure 15:
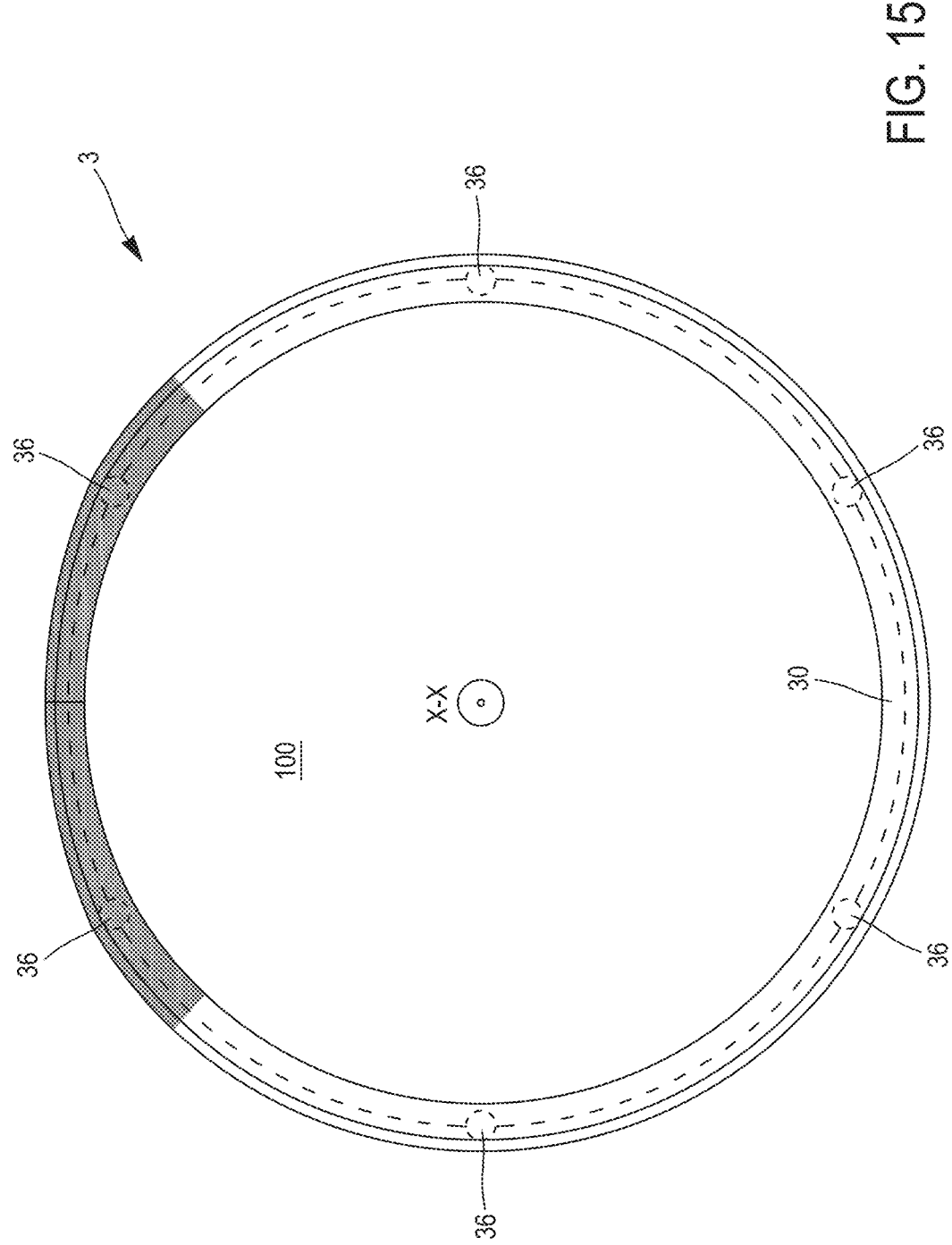
FIG. 15 is a frontal view of the ninth embodiment of an assembly for a gas turbine engine according to the invention illustrated in FIG. 14.

Consequently, in a first embodiment illustrated in FIGS. 14 and 15, it is possible to ensure that over at least one angular portion of the device for modifying the geometry of the air intake 3 the first slat 30 and the second slat 32 are connected such that the internal axial length δ1 and the external axial length δ2 of the airflow channel 34 are zero. Over at least this angular portion, the first slat 30 and the second slat 32 then form a single slat 33, also mobile in translation according to the longitudinal axis X-X relative to the nacelle 1.

In a second embodiment, illustrated in FIGS. 16 and 17, the first slat 30 and the second slat 32 do not extend around the entire longitudinal axis X-X, but only according to an angular portion, for example over the lateral and lower parts of the air intake 100. The upper part of the air intake 100 is bordered by an air intake lip 10 fixed relative to the nacelle 1. In other words, in this second embodiment, the first slat 30 and the second slat 32 extend over a first angular portion of the nacelle 1, a second angular portion of the nacelle being bordered by a fixed part of the air intake lip 10. More precisely, over this second angular portion the air intake lip 10 comprises no device for modifying the geometry of the air intake 3.

The invention claimed is:

1. An assembly for a gas turbine engine comprising:
   a nacelle extending along a longitudinal axis and comprising an intake lip defining an air intake; and a device comprising:
   a first slat presenting a downstream surface; and
   a second slat presenting an upstream surface;
      wherein the first slat and the second slat are mobile in translation along the longitudinal axis relative to the nacelle between:
   a first position wherein the first slat forms the intake lip and the second slat extends inside the nacelle; and a second position wherein the first slat extends at a distance from the intake lip and the second slat forms the intake lip so as to define an airflow channel extending between the downstream surface and the upstream surface.

2. The assembly of claim 1, wherein the nacelle presents a profile extending in a plane radial to the longitudinal axis and the second slat presents an upstream profile in the plane, wherein, in the second position, the upstream profile of the second slat has a tangential continuity with the profile of the nacelle.

3. The assembly of claim 1, wherein the first slat presents a first upstream profile in a plane radial to the longitudinal axis and the second slat presents a second upstream in the plane, the first upstream profile being identical to the second upstream profile.

4. The assembly of claim 1, wherein the second slat
presents a first upstream profile in a first plane radial to the longitudinal axis and a second upstream profile in a second plane radial to the longitudinal axis,
the second upstream profile being different from the first upstream profile, and
wherein the airflow channel (34) presents a first longitudinal section in the first plane and a second longitudinal section in the second plane, the second longitudinal section being different to the first longitudinal section.

5. The assembly of claim 1, wherein the
first slat presents a first downstream profile in a first plane radial to the longitudinal axis and
a second downstream profile in a second plane radial to the longitudinal axis, the second downstream profile being different from the first downstream profile; and
wherein the airflow channel presents a first longitudinal section in the first plane and a second longitudinal section in the second plane, the second longitudinal section being different from the first longitudinal section.

6. The assembly of claim 1, wherein, over at least one angular portion of the device, the first slat and the second slat are connected so as to form a single mobile in translation along the longitudinal axis relative to the nacelle.

7. The assembly of claim 1, wherein the first slat and the second slat extend over a first angular portion of the nacelle; and
wherein the nacelle presents a second angular portion being bordered by a fixed part of the air intake lip.

8. The assembly of claim 1, wherein the device further comprises a guide rod extending parallel to the longitudinal axis and connecting the first slat to the second slat such that the first slat is mounted fixed relative to the second slat over at least one angular portion of the device.

9. The assembly of claim 1, wherein the device further comprises a guide rod extending parallel to the longitudinal axis, the guide rod being telescopic so that over at least one angular portion of the device a movement of the first slat is independent of a movement of the second slat.

10. The assembly of claim 1, wherein the device further comprises a guide rod extending parallel to the longitudinal axis and connecting the first slat to the second slat such that the first slat is mounted fixed relative to the second slat over at least one angular portion of the device;
wherein the assembly further comprises an anti-icing system of the first slat and/or of the second slat, wherein the anti-icing system further comprises an anti-icing fluid circulation channel extending at least in part inside the guide rod.

11. The assembly of claim 1, wherein the device further comprises an actuator lodged in the nacelle and configured to set in motion the first slat and the second slat between the first configuration and the second configuration.

12. The assembly of claim 1, wherein the nacelle has a non-axisymmetric shape.

13. A gas turbine engine comprising:
an engine body; and
the assembly of claim 1, wherein the nacelle encloses the engine body.

* * * * *